United States Patent [19]

Goldman et al.

[11] 4,251,938
[45] Feb. 24, 1981

[54] AQUARIUM FISH NET

[75] Inventors: Marvin A. Goldman, Great Neck; Jerome N. Goldman, New York, both of N.Y.

[73] Assignee: Penn-Plax Plastics, Inc., Garden City, N.Y.

[21] Appl. No.: 47,333

[22] Filed: Jun. 11, 1979

[51] Int. Cl.³ .............................................. A01K 77/00
[52] U.S. Cl. ......................................................... 43/11
[58] Field of Search ..................... 119/5; 43/7, 8, 10, 43/11, 12, 14

[56] References Cited

U.S. PATENT DOCUMENTS

| | | | |
|---|---|---|---|
| 2,253,688 | 8/1941 | Collins | 43/55 |
| 2,847,790 | 8/1958 | Tjernagel | 43/11 |
| 3,394,483 | 7/1968 | Taglioli | 43/11 |
| 3,747,250 | 7/1973 | Willinger | 43/11 |
| 4,044,432 | 8/1977 | Ebata | 43/7 X |
| 4,063,380 | 12/1977 | Grim | 43/11 |
| 4,125,956 | 11/1978 | Killian | 43/11 |

FOREIGN PATENT DOCUMENTS 387682 10/1973 U.S.S.R. ..................................... 43/14

Primary Examiner—Gene Mancene
Assistant Examiner—Robert P. Swiatek
Attorney, Agent, or Firm—Mandeville & Schweitzer

[57] ABSTRACT

A new and improved aquarium fish net having an open, porous pocket defined by spaced, parallel side walls of relatively course mesh or large pore material joined by a continuous, seamless, front-bottom-rear wall of relatively fine mesh or very small pore material. The porous pocket is suspended from a vinyl covered wire frame, the ends of which are twisted together and supported in an elongated wooden handle.

3 Claims, 3 Drawing Figures

AQUARIUM FISH NET

BACKGROUND AND SUMMARY OF THE INVENTION

The art of aquarium fish nets is well developed and includes fish dip nets such as those described in U.S. Pat. Nos. 3,747,250 and 4,063,380, both of which have pockets fabricated from a combination of porous mesh material and non-porous, non-permeable sheet material. Dip nets having such combination-pocket constructions have been designed to reduce the likelihood of fish scales, fish fins or other fish appendages becoming ensnared or entangled in the large pores of netting material. However, the permeable portions of such nets prohibit flow of water therethrough and reduce the maneuverability of such fish nets when submerged in aquarium tanks.

In accordance with the principles of the present invention, the entire net pocket is fabricated from water permeable, porous materials so that the mesh is readily maneuverable through the aquarium tank. However, the major walls of the fish-engaging portion of the aquarium dip net, namely the front, bottom and rear walls, are fabricated from a single continuous sheet of very fine mesh material having a pore size so small that its surface is smooth to fish, thereby preventing the snagging of a fish appendage therein. The side walls of the net pocket are attached to the continuous end edges of the fine mesh front-bottom-rear pocket wall. The coarse mesh, having a large pore size, permits water to pass therethrough at a greater rate than that with which water passes through the continuous fish-engaging front-bottom-rear wall; however, the combined rate of passage of aquarium water through all the walls of the pocket is greater than that inherent in the above-described prior art nets having a combination of permeable and non-permeable pockets, thereby contributing to the maneuverability and efficacy of the fish net of the present invention.

DETAILED DESCRIPTION OF PREFERRED EMBODIMENT

Figure 1:
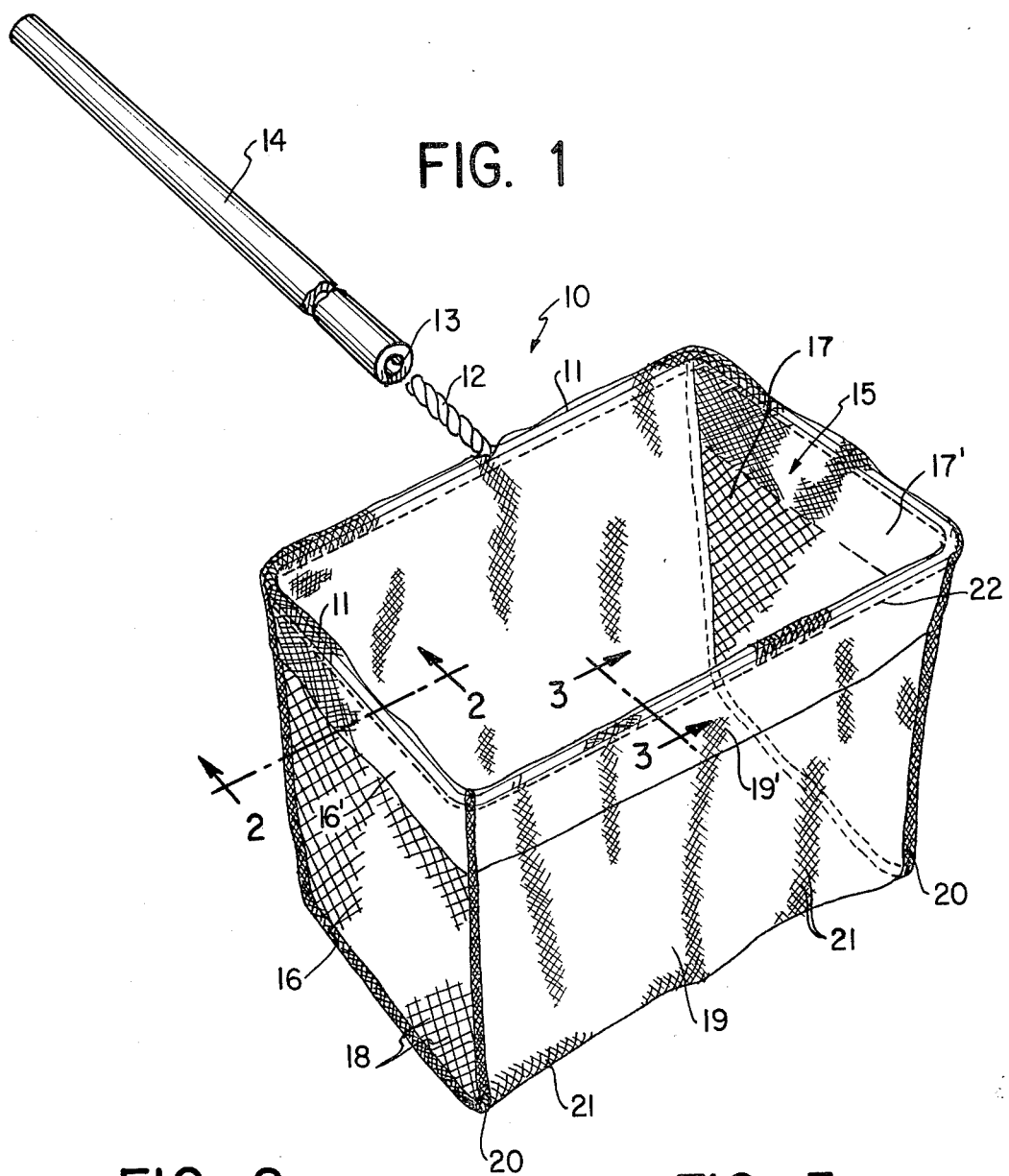
FIG. 1 is a perspective view of a fish net assembly embodying the inventive concepts of the present invention.

Referring now to FIG. 1, disclosed therein is an aquarium dip net 10 comprising a rectangular bent wire frame 11 coated with vinyl, the free ends of which are twisted together to form a generally cylindrical, support arm 12 which is secured by force fit in a mating tubular socket 13 in the end of an elongated cylindrical handle 14 advantageously formed from wood or other dielectric material.

Suspended from the frame 11 is a pocket assembly 15 comprising a pair of end walls 16 and 17 which are fabricated from coarse net material, i.e., net material having large pores 18. The edges of the walls 17, 18 are connected to the edges of a continuous front-bottom-rear wall member 19 by generally U-shaped, external seams 20. The pores 21 of the continuous wall 19 are of relatively microscopic size compared to the pores 18. Advantageously, the fine mesh material of the continuous wall 19 is of closely knitted synthetic fibers; the course mesh material of the side wall 16, 17 is of comparatively loosely knitted synthetic fibers; and the threads or filaments of all of said wall materials as well as the threads used to establish the seams 20 are nylon.

Figure 2:
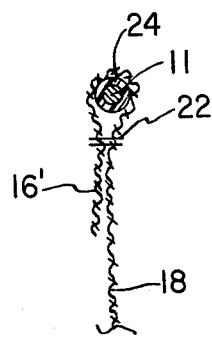
FIG. 2 is an enlarged cross-sectional view taken along line 2—2 of FIG. 1.
Figure 3:
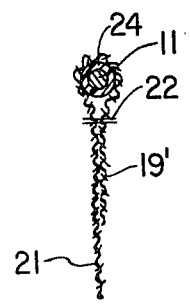
FIG. 3 is an enlarged cross-sectional view taken along line 3—3 of FIG. 1.

The pocket 15 is secured to the frame 11 by folding the upper free edges 16' and 17' over the frame 11 and similarly folding the upper free edge 19' over the wire frame 11 and then joining said free edge portions with the upper portions of the walls 16, 17, 19 by a circumscribing peripheral seam 22 also formed of nylon thread. As shown best in FIGS. 2 and 3, the wire frame 11 is coated or otherwise provided with a vinyl sheath 24. Thus, all of the portions of the fish net which are exposed to the aquarium water are dielectric and contribute to the overall electrical safety of the net in terms of preventing possible short circuiting.

It will be appreciated from the foregoing description that the net of the present invention is readily maneuverable fish in terms of its being able to be manipulated as it is passed through a body of aquarium tank water while possessing a substantial fish-engaging surface portion of smooth, soft, knitted, fine-pored nylon material which will not snag a fish appendage.

It should be understood, of course, that the specific form of the invention herein illustrated and described are intended to be representative only, as certain changes may be made therein without departing from the clear teachings of the disclosure. Accordingly, reference should be made to the following claims in determining the full scope of the invention.

We claim:

1. An aquarium fish net comprising
   (a) a bent wire frame means defining a closed geometrical configuration;
   (b) the free ends of said bent wire means being twisted together to form a generally cylindrical support means;
   (c) a continuous wall means of fire-pored mesh material secured to opposite sides of said frame means and defining continuous front-bottom-rear pocket wall;
   (d) a pair of end wall means of coarse-pored mesh material fastened to said frame means between said continuous wall means;
   (e) elongated seams connecting the side edges of said continuous front-bottom-rear wall means with the side edges of said end wall means to form a porous pocket.

2. The fish net of claim 1, further including
   (a) an elongated dielectric handle means having a cylindrical socket formed at one end portion thereof;
   (b) said socket being adapted to receive and to grip the said twisted wire support means.

3. The fish net of claim 2, in which
   (a) said frame means is generally rectangular;
   (b) said frame means is coated with vinyl.

* * * * *